US007239743B2

(12) United States Patent
Gardella et al.

(10) Patent No.: US 7,239,743 B2
(45) Date of Patent: Jul. 3, 2007

(54) METHODS AND APPARATUS FOR TEXTURE COMPRESSION AND COMPUTER PROGRAM PRODUCT THEREFOR

(75) Inventors: Pierluigi Gardella, Montanaso Lombardo (IT); Massimiliano Barone, Bresso (IT); Daniele Alfonso, Alghero (IT); Danilo Pietro Pau, Sesto San Giovanni (IT); Daniele Lavigna, Locate Triulzi (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 785 days.

(21) Appl. No.: 10/757,038

(22) Filed: Jan. 13, 2004

(65) Prior Publication Data

US 2004/0156543 A1 Aug. 12, 2004

(30) Foreign Application Priority Data

Feb. 6, 2003 (EP) .................................. 03002728

(51) Int. Cl.
*G06K 9/36* (2006.01)
*G06K 9/00* (2006.01)
(52) U.S. Cl. ...................... 382/166; 382/238; 382/251; 345/601; 375/240.12
(58) Field of Classification Search ................ 382/164, 382/165, 166, 167, 232, 235, 238, 250, 251, 382/252, 253; 358/538, 530; 345/589, 590, 345/591, 593, 601; 348/453, 394.1, 411.1, 348/412.1; 375/240.12, 240.03, 240.18
See application file for complete search history.

(56) References Cited

U.S. PATENT DOCUMENTS 4,319,267 A * 3/1982 Mitsuya et al. ............. 358/539
5,663,764 A * 9/1997 Kondo et al. .......... 375/240.14
5,956,431 A 9/1999 Iourcha et al.
6,393,060 B1 * 5/2002 Jeong .................... 375/240.19
6,757,435 B2 * 6/2004 Kondo ....................... 382/238
2003/0161404 A1 * 8/2003 Wu ........................ 375/240.16

OTHER PUBLICATIONS

Delp, et. al. "The Use of Block Truncation Coding In CPCM Image Coding" IEEE Transactions on Signal Processing, IEEE, Inc. vol. 39, No. 4, Apr. 1, 1991, New York, pp. 967-971.
Mitchell, et. al. "Multilevel Graphics Representation Using Block Truncation Coding" Proceedings of the IEEE, IEEE, vol. 68 No. 7, Jul. 1, 1980, New York, pp. 868-873.
Li, et al. "A High Performance Image Compression Technique for Multimedia Applications" IEEE Transactions on Consumer Electronics, IEEE, Inc. vol. 42, No. 2, May 1, 1996, New York, pp. 239-243.
Rao, et al. "A New Algorithm for BTC Image Bit Plane Coding" IEEE Transactions on Communications, IEEE, Inc., vol. 43, No. 6, Jun. 1, 1995, New York, pp. 2010-2011.
Franti, et al. "Compression of Digital Images by Block Truncation Coding: A Survey", Computer Journal, Oxford University Press, vol. 37, No. 4, 1994, Oxford, GB, pp. 308-332.
Subramanian, et al. "Predictive Absolute Moment Block Truncation Coding for Image Compression" Visual Communications and Image Processing 2000, Proceedings of the SPIE—The International Society for Optical Engineering, vol. 4067, pt. 1-3, Jun. 20-23, 2000, Perth, WA, Australia, pp. 830-837.

* cited by examiner

*Primary Examiner*—Matthew C. Bella
*Assistant Examiner*—Ali Bayat
(74) *Attorney, Agent, or Firm*—Hogan & Hartson LLP

(57) ABSTRACT

A method for texture compressing images having a plurality of color components (R, G, B), includes decomposing the images in sub-blocks each including only one color component. At least one first predictor is defined for each sub-block and a respective set of prediction differences is computed for each sub-block. Then the prediction differences for each sub-block are sorted, and a look-up prediction differences palette is set up by defining a look-up prediction error palette. A predetermined code is associated with each column of the error palette.

24 Claims, 4 Drawing Sheets

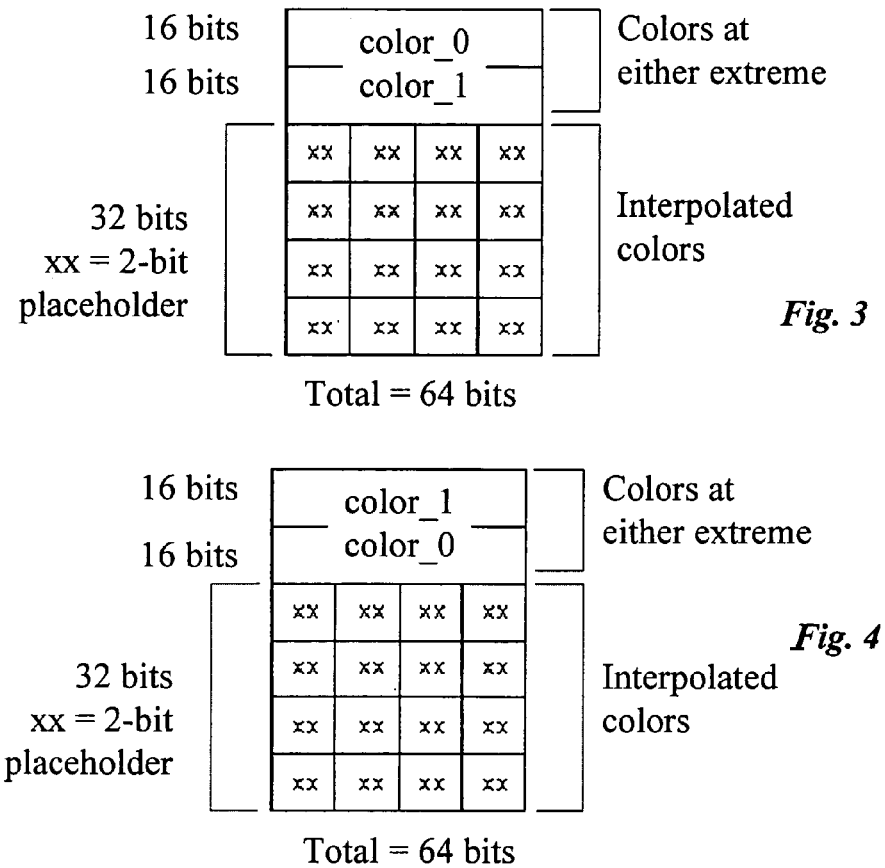
*Fig. 3*
*Fig. 4*
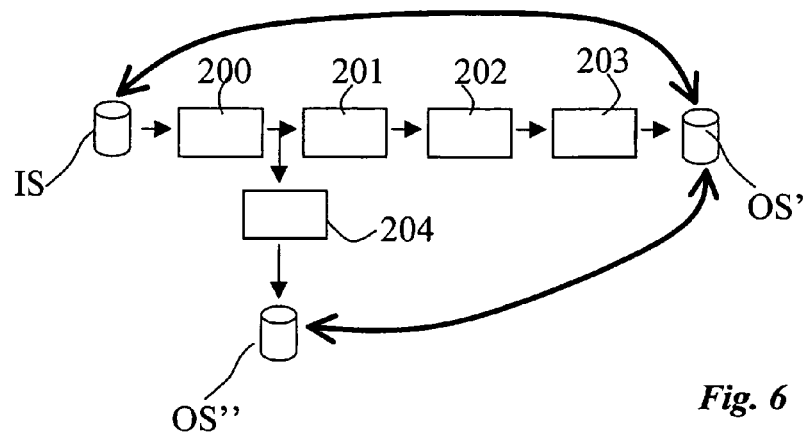
*Fig. 6*

*Fig. 7g*  *Fig. 7h*
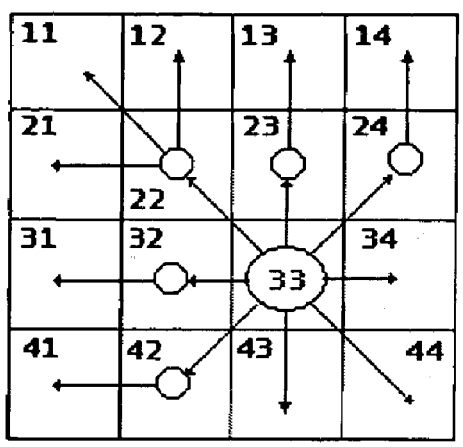
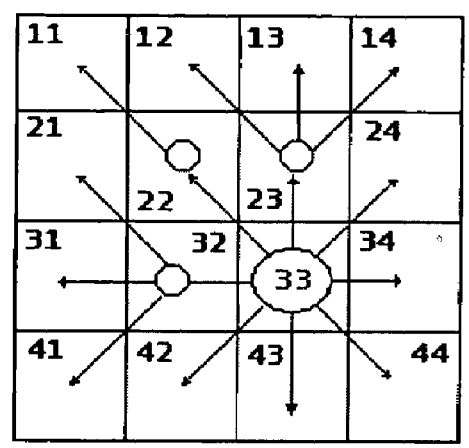

METHODS AND APPARATUS FOR TEXTURE COMPRESSION AND COMPUTER PROGRAM PRODUCT THEREFOR

BACKGROUND OF THE INVENTION

1. Field of the Invention

The present invention relates to texture compression techniques.

2. Background of the Invention

Compression and decompression intended to minimize the memory size needed to store 2D textures is a promising field of application for these techniques in the 3D graphic domain. This possible field of use is becoming more and more significant as the dimensions and number of these textures tend to increase in real applications. The level of detail tends to increase as required by some applications, such as 3D games, and, without the help of such techniques, memory size and bandwidth for access would tend to require increasing performance levels hardly sustainable in mobile, ultra low power, handheld systems. More to the point, these techniques are becoming increasingly important in wireless phone architectures with 3D games processing capabilities.

For example, assuming a texture dimension of 512×512 pixels 16 bit/color each and a depth of 3, the amount of memory needed is 1.5 M bytes. Assuming 20-30 frames per second, the memory bandwidth is 30 to 45 Mbytes/s.

Additional background information on this topic can be gathered from "Real-Time Rendering" by Tomas Akenine-Möller and Eric Haines, A.K. Peters Ltd, $2^{nd}$ edition, ISBN 1568811829.

A well-known solution in this scenario was developed by the company S3; the related algorithm is designated S3TC (where TC stands for Texture Compression).

This has become a widely used de-facto standard and is included in the Microsoft DirectX libraries with adhoc API support.

Compression is performed off-line at system initialization and next the textures are stored in the main memory. Decompression processes act to decompress textures accessing the memory run-time when needed by the graphic engine. This means that only decompression is implemented in hardware form while compression is not.

Important parameters for the decompression engine are: steps needed to decompress textures and possible parallel operation; low latency between data-access-from-memory and data-out-from the decompression engine.

In order to better understand operation of the S3TC algorithm one may refer to an image in RGB format, where each color component R (Red) or G (Green) or B (Blue) is a sub-image composed by N pixels in the horizontal dimension and M pixels in vertical dimension. If each color component is coded with P bits, the number of bits per image is N*M*3*P.

For example, assuming N=M=256 and P=8, then the resulting size is 1,572,864 bits. If each sub-image R or G or B is decomposed in non-overlapping blocks of Q pixels in the horizontal dimension and S pixel in the vertical dimension, the number of blocks per sub-image is (N*M)/(Q*S) while per image is [3(NM/(Q*S)] and the number of bits per block is [3*(Q*S)]*P. If, for example Q=S=4 and P=8, then the resulting size of each block is 384 bits. If the number of bits per channel is R=5, G=6, B=5 then the resulting size of each block per image is (4*4)*(5+6+5)=256 bits. The S3TC algorithm is able to compress such an amount of data by 6 times when R=8, G=8, B=8 and 4 times when R=5, G=6, B=5. 64 bits compose the resulting compressed block always sent to decompression stage. This number is the results of the coding steps described below assuming Q=S=4.

To sum up, operation of the S3TC algorithm may be regarded as comprised of the following steps:

i) Decompose the R G B image in non-overlapped (Q=4) *(S=4) blocks of R G B colors ii) Consider the following block composed by 16 pixels each one composed by R, G and B color components:

$Pij=R_{ij} \cup G_{ij} \cup B_{ij}$ (this denotes the pixel at the ij position the R G B image, and U is the union operator)

| | | | |
|---|---|---|---|
| (R11 G11 B11) | (R12 G12 B12) | (R13 G13 B13) | (R14 G14 B14) |
| (R21 G21 B21) | (R22 G22 B22) | (R23 G23 B23) | (R24 G24 B24) |
| (R31 G31 B31) | (R32 G32 B32) | (R33 G33 B33) | (R34 G34 B34) |
| (R41 G41 B41) | (R42 G42 B42) | (R43 G43 B43) | (R44 G44 B44) | iii) Decompose the block above in three sub-blocks called sub-block R, sub-block G and sub-block B as shown herein below, each block including only one color component:

| | | | | |
|---|---|---|---|---|
| R11 | R12 | R13 | R14 | sub-block R |
| R21 | R22 | R23 | R24 | |
| R31 | R32 | R33 | R34 | |
| R41 | R42 | R43 | R44 | |

| | | | | |
|---|---|---|---|---|
| G11 | G12 | G13 | G14 | sub-block G |
| G21 | G22 | G23 | G24 | |
| G31 | G32 | G33 | G34 | |
| G41 | G42 | G43 | G44 | |

| | | | | |
|---|---|---|---|---|
| B11 | B12 | B13 | B14 | sub-block B |
| B21 | B22 | B23 | B24 | |
| B31 | B32 | B33 | B34 | |
| B41 | B42 | B43 | B44 | | as shown in FIG. 1. Specifically, FIG. 1 shows RGB blocks ordered in different planes, with a RGB block shown on the left and a corresponding de-composition shown on the right.

iv) Sort in ascending order each sub-block color v) Detect the black color, which is a pixel made of R=0 and G=0 and B=0 vi) If the black color is not detected, then set a color palette made by
  a. 1st color is the minimum value of sub-block R (min_R), minimum value of sub-block G (min_G), minimum value of sub-block B (min_B).
  b. 2nd color is the maximum value of sub-block R (max_R), maximum value of sub-block G (max_G), maximum value of sub-block B (max_B)
  c. $3^{rd}$ (Int1) is composed by (2*min R+max R)/3 (Int1R), (2*min G+max G)/3 (Int1G), (2*min B+max B)/3 (Int1B)
  d. $4^{th}$ (Int2) is composed by (min R+2*max R)/3 (Int2R), (min G+2*max G)/3 (Int2G), (min B+2*max B)/3 (Int2B)

vii) Otherwise, if black color is detected then set a color palette made by
   a. $1^{st}$ color is minimum value of sub-block R (min_R), sub-block G (min_G), sub-block B (min_B) where each of them must not be equal to zero (the black color component) at the same time
   b. $2^{nd}$ color is maximum value of sub-block R (max_R), sub-block G (max_G), sub-block B (max_B)
   c. $3^{rd}$ (Int1) is composed by (min R+max R)/2 (Int1R), (min G+max G)/2 (Int1G), (min B+max B)/2 (Int1B)
   d. $4^{th}$ is the black color that has R,G,B components equal to zero
viii) If black color is not detected define the look-up color palette as Look-up table = [Min_R,  *Int1R*,  *Int2R*,  Max_R]
               [Min_G,  *Int1G*,  *Int2G*,  Max_G]
               [Min_B,  *Int1B*,  *Int2B*,  Max_B]

If black color is detected define the color palette as

Look-up table = [*MinR*,  *Int1R*,  *MaxR*  0]
               [*MinG*,  *Int1G*,  *MaxG*  0]
               [*MinB*,  *Int1B*,  *MaxB*  0]

ix) Associate the following 2 bits code (in boldface, under the palette) to each column of the above palette Look-up table = [*MinR*,  *Int1R*,  *Int2R*,  *MaxR*]
               [*MinG*,  *Int1G*,  *Int2G*,  *MaxG*]
               [*MinB*,  *Int1B*,  *Int2B*,  *MaxB*]
                 00      01       10       11

Look-up table = [*MinR*,  *Int1R*,  *MaxR*,  0]
               [*MinG*,  *Int1G*,  *MaxG*,  0]
               [*MinB*,  *Int1B*,  *MaxB*,  0]
                 00      01       10       11 x) For each $P_{ij}=R_{ij} \cup G_{ij} \cup B_{ij}$ (where i ranges from 1 to Q=4 and j ranges from 1 to S=4) compute the Euclidean distance Dist between it and each look-up color as defined above in vi.a,b,c,d or vii.a,b,c,d depending if black color has been detected or not. Essentially this is the Euclidean distance between two points in a three-dimensional coordinate space. Also, the difference is within a homologous color component (between R or G or B).

$$Dist1=\sqrt{(|R_{ij}-MinR|^2+|G_{ij}-MinG|^2+|B_{ij}-MinB|^2)}$$

$$Dist2=\sqrt{(|R_{ij}-Int1R|^2+|G_{ij}-Int1G|^2+|B_{ij}-Int1B|^2)}$$

$$Dist3=\sqrt{(|R_{ij}-Int2R|^2+|G_{ij}-Int2G|^2+|B_{ij}-Int2B|^2)}$$

$$Dist4=\sqrt{(|R_{ij}-MaxR|^2+|G_{ij}-MaxG|^2+|B_{ij}-MaxB|^2)}$$

xi) For each $P_{ij}=R_{ij} \cup G_{ij} \cup B_{ij}$ find the minimum distance among Dist1, Dist2, Dist3 and Dist4. For example let it be Dist1.

xii) Send to a decoder process the code associated to the color enclosed in the look-up table that has the minimum distance. If it is Dist1 then the code is 00.

xiii) The decoder receives for each Q*S block as shown in FIG. 2
   a. a two-bit code for each Pij that are addresses to the look-up table
   b. MinR MinG MinB
   c. MaxR MaxG MaxB xiv) If Min is received before Max by the decoder then black has been detected by the encoder otherwise not xv) As shown in FIG. 2, the decoder operates as described in steps vi or vii depending on black color detection, computing
   a. Int1R Int1G Int1Band Int2R Int2G Int2B if black color is not detected by encoder
   otherwise
   b. Int1R Int1G Int1B if black color is detected by encoder xvi) As shown in FIG. 2, the decoder addresses a look-up table with 2 bits code associated to each Pij and replaces it with the color stored in the look-up table color palette. Specifically ST, LUT, and CT indicate the source text, the look-up table, and the compressed text, respectively.

FIG. 3 shows how the data sent to the decoder are arranged in a bitstream and if the black color is not detected, while FIG. 4 shows the opposite case.

As stated before, the compression ratio is 6:1 or 4:1. This is because if colors are in R=8 G=8 B=8 format then 384 bits are coded with 64 (384/64=6) and if colors are in R=5 G=6 B=5 format then 256 bits are coded with 64 (256/64=4).

As shown in FIGS. 3 and 4, the sum of all the bits amounts to 64.

SUMMARY OF THE INVENTION

However satisfactory the prior art solution considered in the foregoing may be, the need is felt for alternative texture compression/decompression techniques of improved quality.

The aim of the present invention is thus to provide such an alternative, improved technique, leading to better performance in terms of quality achieved and complexity needed for its implementation.

According to the present invention, such an object is achieved by means of a method having the features set forth in the claims that follow. The invention also encompasses the decoding process as well as corresponding apparatus in the form of either a dedicated processor or a suitably programmed general-purpose computer (such as a DSP). In that respect the invention also relates to a computer program product directly loadable into the memory of a digital computer such as a processor and including software code portions performing the method of the invention when the product is run on a computer.

The preferred embodiment of the invention provides a significant improvement over prior art solutions such as S3TC from different viewpoints, since it uses the following compression tools:
   color prediction,
   color-de-correlation,
   sorting of the prediction errors,
   generation of the look-up table,
   bitstream packing, and
   decoding process.

These tools are different from those used in S3TC or not even provided in S3TC.

BRIEF DESCRIPTIONS OF THE DRAWINGS

The invention will now be described, by way of example only, with reference to the annexed figures of drawing, wherein:

FIGS. 1 to 4, pertaining to the prior art, have already been described in the foregoing, FIG. 5 shows a R or G or B sub-block sorted from left to right in ascending order in a possible embodiment of the invention;

FIG. 6 is a block diagram of a pipeline arrangement to evaluate the performance of the compression and decompression techniques described herein;

FIGS. 7a to 7h are diagrams showing the directions used to scan and predict pixels in the arrangement shown herein.

DETAILED DESCRIPTION

A first embodiment of the invention will now be described by using the same approach previously adopted for describing, in the case of Q=S=4, the S3TC arrangement.

This method will first be described by referring to an exemplary embodiment where Q=S=3.

i) Decompose the R G B image in non-overlapped Q×S blocks of R G B colors ii) Consider the following 3×3 block composed by nine pixels each one composed by R, G and B components:

$P_{ij} = R_{ij} \cup G_{ij} \cup B_{ij}$ (where $P_{ij}$ again denotes the pixel placed in the ij position in the R G B image, and U is the union operator)

| (R11 G11 B11) | (R12 G12 B12) | (R13 G13 B13) |
| (R21 G21 B21) | (R22 G22 B22) | (R23 G23 B23) |
| (R31 G31 B31) | (R32 G32 B32) | (R33 G33 B33) | iii) Decompose the above block in three sub-blocks called sub-block R, sub-block G and sub-block B, respectively, as shown below, wherein each block includes only a color component:

| R11 | R12 | R13 | sub-block R |
| R21 | R22 | R23 | |
| R31 | R32 | R33 | |

| G11 | G12 | G13 | sub-block G |
| G21 | G22 | G23 | |
| G31 | G32 | G33 | |

Figure 1:
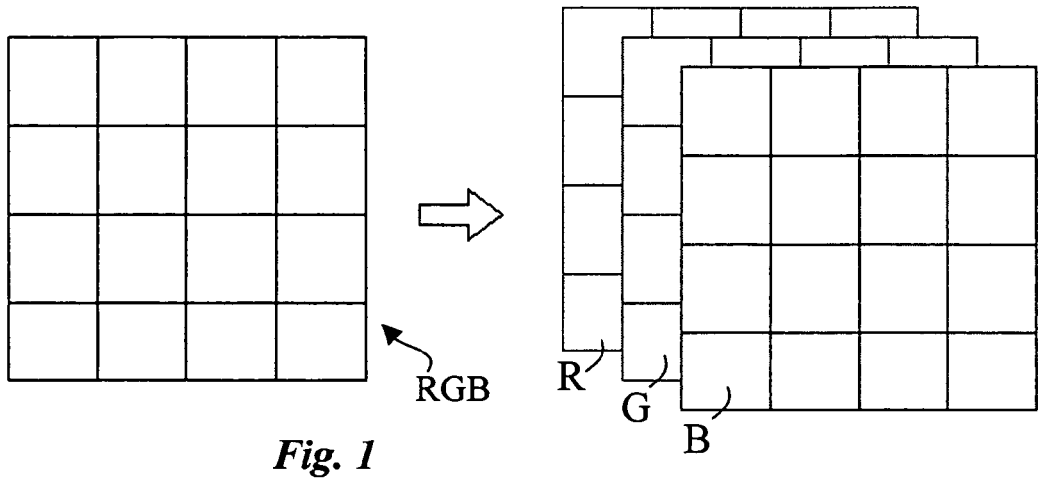
Figure 2:
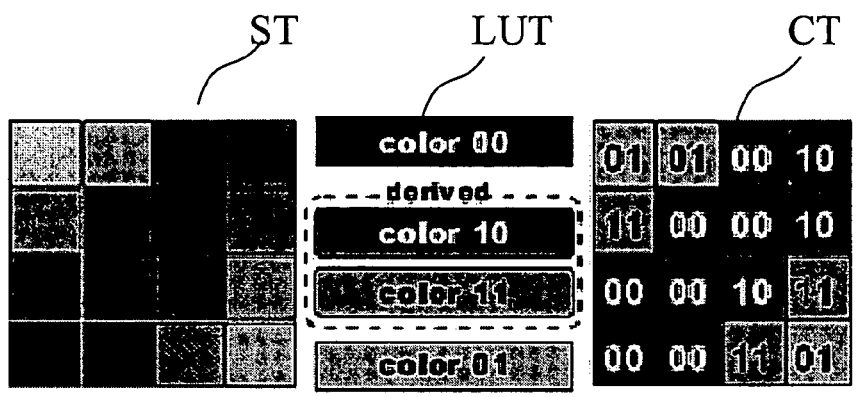
Figure 5:
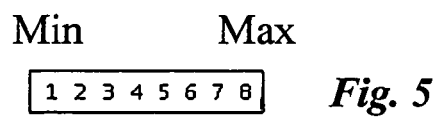

| B11 | B12 | B13 | sub-block B |
| B21 | B22 | B23 | |
| B31 | B32 | B33 | | iv) Define a 1st predictor for each sub-block
 a. R22 as prediction for all colors in the same sub-block R excluding R22
 b. G22 as prediction for all colors in the same sub-block G excluding G22
 c. B22 as prediction for all colors in the same sub-block B excluding B22 v) Compute for each sub-block the following prediction differences:
 a. Sub-block R
  i. (R22-R11),(R22-R12),(R22-R13),(R22-R21),(R22-R23), (R22-R31),(R22-R32),(R22-R33)
 b. Sub-block G
  i. (G22-G11),(G22-G12),(G22-G13),(G22-G21),(G22-G23), (G22-G31),(G22-G32),(G22-G33)
 c. Sub-block B
  i. (B22-B11), (B22-B12), (B22-B13), (B22-B21), (B22-B23), (B22-B31),(B22-B32),(B22-B33)

vi) Sort in ascending order the prediction differences in each sub-block as shown in FIG. 5: specifically, the figure shows R or G or B sub-block prediction differences sorted from left to right in ascending order; each number is the position in ascending order that addresses each prediction difference.

vii) Set up a look-up prediction difference palette wherein
 a. $1^{st}$ value is the minimum for the prediction differences in sub-block R. The same applies for the prediction differences in sub-blocks G and B, thus yielding min_errorR, min_errorG, min_errorB.
 b. $2^{nd}$ value is the maximum for the prediction differences in sub-block R. The same applies for the prediction differences in sub-blocks G and B thus yielding max_errorR, max_errorG, max_errorB.
 c. $3^{rd}$ is Int1 composed by
  i. Int1R=(2*min_errorR+max_errorR)/3, Int1G=(2*min_errorG+max_errorG)/3, Int1B=(2*min_errorB+max_errorB)/3
 d. $4^{th}$ is Int2 composed by
  i. Int2R=(min_errorR+2*max_errorR)/3 Int2G=(min_errorG+2*max_errorG)/3, Int2B=(min_errorB+2*max_errorB)/3

(In fact the relationships reported in the foregoing correspond to the presently preferred choice within the general relationships:

$$Int1(R, G, B) = (a*\text{min\_errorR} + b*\text{max\_errorR})/(a+b),$$
$$(c*\text{min\_errorG} + d*\text{max\_errorG})/(c+d),$$
$$(e*\text{min\_errorB} + f*\text{max\_errorB})/(e+f),$$

$$Int2(R, G, B) = g*\text{min\_errorR} + h*\text{max\_errorR})/(g+h),$$
$$(i*\text{min\_errorG} + l*\text{max\_errorG})/(i+l),$$
$$(m*\text{min\_errorB} + n*\text{max\_errorB})/(m+n)$$

where a, b, c, d, e, f, g, h, i, l, m, and n are weighing factors).

viii) Define a look-up prediction error palette as

Look-up table = [Min_errorR, Int1R, Int2R, Max_errorR]
[Min_errorG, Int1G, Int2G, Max_errorG]
[Min_errorB, Int1B, Int2B, Max_errorB]

ix) Associate the following 2 bit code with each column of the above palette

Look-up table = [Min_errorR, Int1R, Int2R, Max_errorR]
[Min_errorG, Int1G, Int2G, Max_errorG]
[Min_errorB, Int1B, Int2B, Max_errorB]

| 2 BIT CODE = | 00 | 01 | 10 | 11 |
|---|---|---|---|---| x) For each Pij=$R_{ij}$ U $G_{ij}$ U $B_{ij}$ (where i ranges from 1 to Q=3 and j ranges from 1 to S=3) compute the prediction error using P22 as predictor.
  a. The prediction error is defined as $E_{ij}$=$E_{Rij}$ U $E_{Gij}$ U $E_{Bij}$=($R_{22}$-$R_{ij}$) U ($G_{22}$-$G_{ij}$) U ($B_{22}$-$B_{ij}$)
xi) For each $E_{ij}$ compute the Euclidean distance between it and each look-up color as defined above in step ix. This is again the Euclidean distance between two points in a three-dimensional coordinate space and the difference is between homologous prediction error components.

$$Dist1=\sqrt{(|E_{Rij}-\text{Min\_error}R|^2+|E_{Gij}-\text{Min\_error}G|^2+|E_{Bij}-\text{Min\_error}B|^2)}$$

$$Dist2=\sqrt{(|E_{Rij}-\text{Int1}R|^2+|E_{Gij}-\text{Int1}G|^2+|E_{Bij}-\text{Int1}B|^2)}$$

$$Dist3=\sqrt{(|E_{Rij}-\text{Int2}R|^2+|E_{Gij}-\text{Int2}G|^2+|E_{Bij}-\text{Int2}B|^2)}$$

$$Dist4=\sqrt{(|E_{Rij}-\text{Max\_error}R|^2+|E_{Gij}-\text{Max\_error}G|^2+|E_{Bij}-\text{Max\_error}B|^2)}$$

xii) For each $E_{ij}$=$E_{Rij}$ U $E_{Gij}$ U $E_{Bij}$ find the minimum distance among Dist1, Dist2, Dist3 and Dist4. For example this may be Dist1.
xiii) Compose a bitstream as follows:
  a. P22 color=16 bits
  b. P22+Min_error=16 bits (=P22R+min_errorR U P22G+min_errorG U P22B+min_errorB)
  c. P22+Max_error=16 bits (=P22R+max_errorR U P22G+max_errorG U P22B+max_errorB)
  d. For each $P_{11}$, $P_{12}$, $P_{13}$, $P_{21}$, $P_{23}$, $P_{31}$, $P_{32}$, $P_{33}$ a 2 bits code is associated following steps 11, 12, 13. For example if Dist1 is the minimum distance for $P_{ij}$ then the code associated and transmitted to it is 00.
xiv) Each 3*3 block in encoded to 16+16+16+(8*2)=64 bits instead of 144 bits with a compression factor of 2.25 if the RGB source format is 565. The value 3.375 if the RGB source format is 888.

In the decoding process, the decoder will receive the incoming bitstream and proceed through the following steps:
  a. Get P22
  b. Get P22+Min_error (=P22R+min_errorR U P22G+min_errorG U P22B+min_errorB)
  c. Get P22+Max_error (=P22R+max_errorR U P22G+max_errorG U P22B+max_errorB)
  d. Then compute Min_error and Max_error inverting formula described in the above steps a,b for each color R,G,B as
  i. Min_error=(P22+Min_error)−P22
  ii. Max_error=(P22+Max_error)−P22
  e. Next compute look-up prediction error palette as per step vii) c,d and viii)
  f. Use 2 bit code to address look-up table and adding the value (thus addressed) to P22 to recreate each $P_{ij}$ The arrangement disclosed in the foregoing has been implemented for the following standard images and using two formats: RGB 565 and RGB 888, where 5, 6 or 8 are the number of bits per color channel.
1. 256×256 (horizontal×vertical size dimension)
Abstrwav
Bricks
Bricks2
Chapt
Forest
Image0
Intel
Pixtest
Reference
Rov
Teleport
Topsmap
2. 512×512 (horizontal×vertical size dimension)
Donut
3. 640×480 (horizontal×vertical size dimension)
Balloon
DragonFly
Paper
Particles
Sparkle These pictures are a representative set on which typically texture compression is applied. All pictures are in true-color format or 888, while the 565 are obtained from 888 truncating the 323 lowest bits of the 888 pictures. Alternative truncating methods can be used to transform 888 pictures into 565 pictures such as "rounding to nearest integer", "Floyd-Steinberg dithering" etc. These alternatives do not entail changes to the arrangement disclosed herein.

To measure the performance of each algorithm, visual assessments and objective measures were performed, by taking two parameters as the reference measures, namely mean square error (MSE) and peak signal/noise ratio (PSNR) for each RGB channel.

FIG. 6 shows how measurements are carried out in the simulation environment.

Input images IS in the 888 format (called Source888) are converted at 200 into the 565 format (called Source 565), then compressed at 201 and further decompressed at 202 to the 565 format. These images are back converted at 203 into the 888 format to generate a first set of output images OS' (also called Decoded888).

The Source-565 images from block 200 are back converted into the 888 format at 204 to generate a second set of output images OS" to be used as a reference (called Source565to888).

A first set of PSNR values (called PSNR 888) are computed between the Source 888 IS and the Decoded888 OS' images. A second set of PSNR (called PSNR 565) values are computed between the Source565to888 OS" and the Decoded888 OS' images.

The 565 images are back reported to the 888 format by simple zero bit stuffing of the 323 least important positions.

How the Source888 IS images are converted to the 565 format and back to the 888 format corresponds to conventional techniques that do not need to be described in detail herein.

Mean squared (MSE) and peak (PSNR) error are defined as follows:

$$MSE=(\Sigma|Pij-Paij|^2)/(W*h) \text{ where: Pij=source color}$$

Paij=processed color, after-coding and decoding w, h=image width, height $$PSNR = 10 \log_{10}[(2^{bpp}-1)^2/MSE] \text{ where: bpp=bit per color}$$

Due to its predictive nature, the arrangement previously described is almost invariably able to achieve better performance, while yielding a lower compression ratio than S3TC.

The proposed arrangement can be easily extended to Q=4×S=4 blocks by simply adding one more column at the right side and one more row at the bottom side of the Q=3×S=3 "chunk".

The main difference with respect to the embodiment described in the foregoing is related to the possibility of adopting a plurality of different patterns for extending the 3×3 block to a 4×4 block as best shown in FIG. 7 of the drawing.

This extension will be described in the following.

i) Decompose the R G B image in non overlapped Q×S blocks of R G B colors ii) Consider the following Q=4×S=4 block composed of 16 pixels each one composed by R, G and B components:
$P_{ij} = R_{ij} \cup G_{ij} \cup B_{ij}$ (where $P_{ij}$ is again the pixel at the ij position in the R G B image, and U is the union operator)

| | | | |
|---|---|---|---|
| (R11 G11 B11) | (R12 G12 B12) | (R13 G13 B13) | (R14 G14 B14) |
| (R21 G21 B21) | (R22 G22 B22) | (R23 G23 B23) | (R24 G24 B24) |
| (R31 G31 B31) | (R32 G32 B32) | (R33 G33 B33) | (R34 G34 B34) |
| (R41 G41 B41) | (R42 G42 B42) | (R43 G43 B43) | (R44 G44 B44) | iii) Decompose the above block in three sub-blocks called sub-block R, sub-block G and sub-block B. respectively, as shown below, wherein each block includes only a color component

| | | | | |
|---|---|---|---|---|
| R11 | R12 | R13 | R14 | sub-block R |
| R21 | R22 | R23 | R24 | |
| R31 | R32 | R33 | R34 | |
| R41 | R42 | R43 | R44 | |

| | | | | |
|---|---|---|---|---|
| G11 | G12 | G13 | G14 | sub-block G |
| G21 | G22 | G23 | G24 | |
| G31 | G32 | G33 | G34 | |
| G41 | G42 | G43 | G44 | |

| | | | | |
|---|---|---|---|---|
| B11 | B12 | B13 | B14 | sub-block B |
| B21 | B22 | B23 | B24 | |
| B31 | B32 | B33 | B34 | |
| B41 | B42 | B43 | B44 | | iv) Define a 1$^{st}$ predictor for each sub-block
g. R22 as prediction for 3×3 colors surrounding R22 (i.e. R11, R12, R13, R21, R23, R31, R32, R33)
h. G22 as prediction for 3×3 colors surrounding G22 (i.e. G11, G12, G13, G21, G23, G31, G32, G33)
i. B22 as prediction for 3×3 colors surrounding B22 (i.e. B11, B12, B13, B21, B23, B31, B32, B33)
See, in that respect, FIG. 7a, where this prediction pattern is represented geometrically.

v) Define
j. a 2$^{nd}$ set of predictors (see FIG. 7b) where:
  i. R23 as prediction for R14 R24 R34
  ii. R32 as prediction for R41 R42 R43
  iii. R33 as prediction for R44
  iv. G23 as prediction for G14 G24 G34
  v. G32 as prediction for G41 G42 G43
  vi. G33 as prediction for G44
  vii. B23 as prediction for B14 B24 B34
  viii. B32 as prediction for B41 B42 B43
  ix. B33 as prediction for B44
k. or a 3$^{rd}$ set of predictors (see again the pattern shown in FIG. 7a) with
  i. R13 as prediction for R14
  ii. R23 as prediction for R24
  iii. R33 as prediction for R34 R44 R43
  iv. R31 as prediction for R41
  v. R32 as prediction for R42
  vi. G13 as prediction for G 14
  vii. G23 as prediction for G24
  viii. G33 as prediction for G34 G44 G43
  ix. G31 as prediction for G41
  x. G32 as prediction for G42
  xi. B13 as prediction for B14
  xii. B23 as prediction for B24
  xiii. B33 as prediction for B34 B44 B43
  xiv. B31 as prediction for B41
  xv. B32 as prediction for B42

Figure 8:
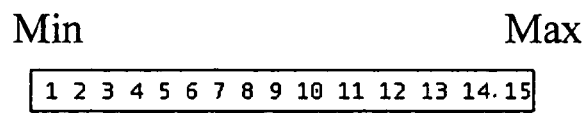
FIGS. 8 and 9 show additional details of possible embodiments of the arrangement described herein.

It will be appreciated that other prediction patterns are feasible, as shown in FIGS. 7c to 7h.

vi) Compute for each sub-block the following prediction differences:
1. Sub-block R
  i. (R22-R11),(R22-R12),(R22-R13),(R22-R21), (R22-R23),(R22-R31),(R22-R32),(R22-R33)
  ii. and the differences between predictors as defined in step v.j and v.k and related homologous colors
m. Sub-block G
  i. (G22-G11),(G22-G12),(G22-G13),(G22-G21), (G22-G23),(G22-G31),(G22-G32),(G22-G33)
  ii. and the differences between predictors as defined in step v.j and v.k and related homologous colors
n. Sub-block B
  i. (B22-B11),(B22-B12),(B22-B13),(B22-B21), (B22-B23),(B22-B31),(B22-B32),(B22-B33)
  ii. and the differences between predictors as defined in step v.j and v.k and related homologous colors
o. From this point onwards, up to 8 full encodings of the block will run in parallel depending on the set of predictors used (since up to 8 prediction configurations are possible). At the end of the 8 encodings the arrangement disclosed herein will compute the MSE between block before and after each encoding (out of 8 possible). The one with the minimum MSE will be selected to generate the bitstream that will be sent to the decoder.

vii) Sort in ascending order the prediction differences for each sub-block as shown in FIG. 8. Each number is the position that addresses each prediction differences in ascending order. Specifically, FIG. 8 shows R or G or B sub-block prediction differences sorted from left to right in ascending order viii) Two groups are defined by the sorted prediction differences. The first is composed by the three lowest elements and the second by the three highest as shown in FIG. 8.

ix) Set a look-up prediction differences palette composed as follows:
  e. $1^{st}$ value is the median of the 1st group as defined in step 8 for sub-block R prediction differences. The same applies for sub-block G and B, thus yielding min_median_errorR, min_median_errorG, min_median_errorB.
  f. $2^{nd}$ value is the median of the $2^{nd}$ group as defined in step 8 for sub-block R prediction differences. The same applies for sub-block G and B, thus yielding max_median_errorR, max_median_errorG, max_median_errorB.
  g. $3^{rd}$ is Int1 composed by
    i. Int1R=(2*min_median_errorR+max_median_error)/3, Int1G=(2*min_median_errorG+max_median_errorG)/3, Int1B=(2*min_median_errorB+max_median_errorB)/3
  h. $4^{th}$ is Int2 composed by
    i. Int2R=(min_median_errorR+2*max_median_errorR)/3, Int2G=(min_median_errorG+2*max_median_errorG)/3, Int2B=(min_median_errorB+2*max_median_errorB)/3

Figure 9:
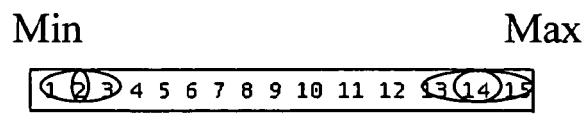
Figure 7A:
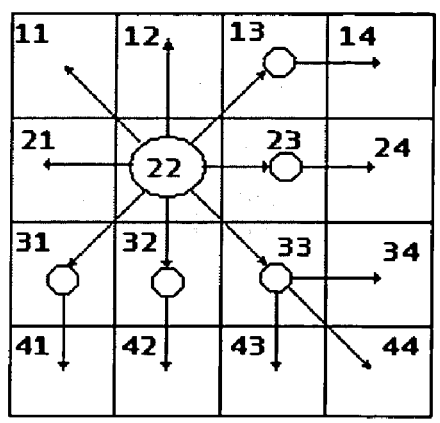
Figure 7B:
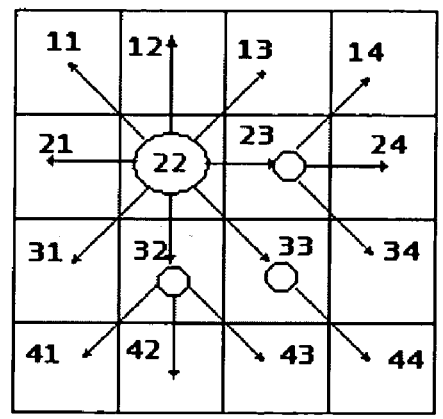
Figure 7C:
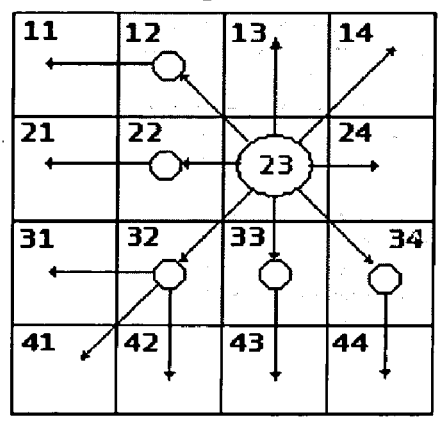
Figure 7D:
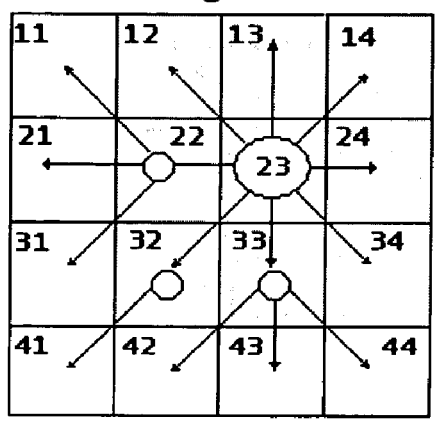
Figure 7E:
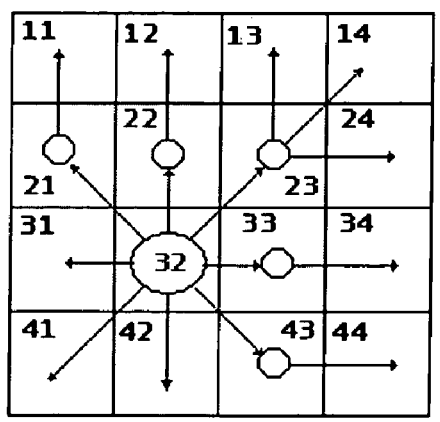
Figure 7F:
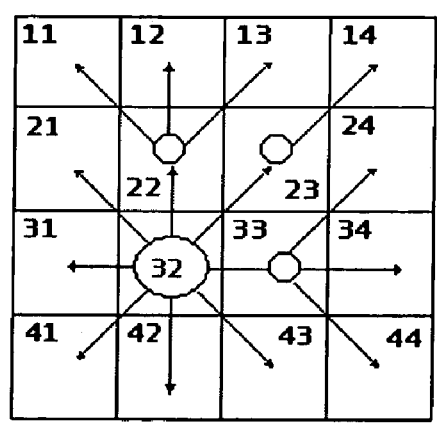

In FIG. 9 the groups and the two representative colors for each R, G, B sub-block are shown.

(In fact the relationships reported in the foregoing correspond to the presently preferred choice within the general relationships:

$$Int1(R, G, B) = (a*\text{min\_median\_errorR} + b*\text{max\_median\_errorR})/(a+b),$$
$$(c*\text{min\_median\_errorG} + d*\text{max\_median\_errorG})/(c+d),$$
$$(e*\text{min\_median\_errorB} + f*\text{max\_median\_errorB})/(e+f),$$

$$Int2(R, G, B) = (g*\text{min\_median\_errorR} + h*\text{max\_median\_errorR})/(g+h),$$
$$(i*\text{min\_median\_errorG} + l*\text{max\_median\_errorG})/(i+l),$$
$$(m*\text{min\_median\_errorB} + n*\text{max\_median\_errorB})/(m+n)$$

where a, b, c, d, e, f, g, h, i, l, m, and n are weighing factors).

x) Define the look-up prediction error palette as

Look-up table = [Min_median_errorR, Int1R, Int2R, Max_median_errorR]
[Min_median_errorG, Int1G, Int2G, Max_median_errorG]
[Min_median_errorB, Int1B, Int2B, Max_median_errorB]

xi) Associate the following 2 bits code with each column of the above palette

Look-up table = [Min_median_errorR, Int1R, Int2R, Max_median_errorR]
[Min_median_errorG, Int1G, Int2G, Max_median_errorG]
[Min_median_errorB, Int1B, Int2B, Max_median_errorB]

| 2 BITS CODE = | 00 | 01 | 10 | 11 |
| --- | --- | --- | --- | --- | xii) For each $P_{ij} = R_{ij} \cup G_{ij} \cup B_{ij}$ (where i ranges from 1 to Q=4 and j ranges from 1 to S=4) compute the prediction error using predictors as defined in steps v and vi.

p. Define the prediction error $E_{ij} = E_{Rij} \cup E_{Gij} \cup E_{Bij} = (\text{Predictor}R_{kl} - R_{ij}) \cup (\text{Predictor}G_{kl} - G_{ij}) \cup (\text{Predictor}B_{kl} - B_{ij})$ xiii) For each $E_{ij}$ compute the Euclidean distance between it and each look-up color as defined above in step ix. This is again the Euclidean distance between two points in a three-dimensional coordinate space and the difference is between homologous prediction error components.

$$Dist1 = \sqrt{(|E_{Rij} - \text{Min\_median\_error}R|^2 + |E_{Gij} - \text{Min\_median\_error}G|^2 + |E_{Bj} - \text{Min\_median\_error}B|^2)}$$

$$Dist2 = \sqrt{(|E_{Rij} - Int1R|^2 + |E_{Gij} - Int1G|^2 + |E_{Bij} - Int1B|^2)}$$

$$Dist3 = \sqrt{(|E_{Rij} - Int2R|^2 + |E_{Gij} - Int2G|^2 + |E_{Bij} - Int2B|^2)}$$

$$Dist4 = \sqrt{(|E_{Rij} - \text{Max\_median\_error}R|^2 + |E_{Gij} - \text{Max\_median\_error}G|^2 + |E_{Bij} - \text{Max\_median\_error}B|^2)}$$

xiv) For each $E_{ij} = E_{Rij} \cup E_{Gij} \cup E_{Bij}$ find the minimum distance among Dist1, Dist2, Dist3 and Dist4. For example, this may be Dist1, and the two-bit code associated thereto is 00.

xv) Each Q*S block is fully coded in 8 different sessions, where in each session uses one of the 8 configurations for the predictions shown in FIGS. 7a to 7h:
  a. decode as per steps from xvi) below onward each of these 8 coded blocks
  b. for each decoded block and for each color component R, G or B compute the sum of squared differences between decoded colors and source ones (the one before their encoding)
  c. add the 3 numbers computed during step xv.b and find the minimum between the 8 options xvi) Compose a bitstream as follows:
  q. P22 color=16 bits
  r. P22+Min_median_error=16 bits (=P22R+Min_median_ error U P22G+Min_median_errorG U P22B+Min_ median_errorB)
  s. P22+Max_median_error=16 bits (=P22R+Max_median_error U P22G+Max_median_errorG U P22B+Max_ median_errorB)
  t. For each $P_{11}$, $P_{12}$, $P_{13}$, $P_{14}$, $P_{21}$, $P_{23}$, $P_{24}$, $P_{31}$, $P_{32}$, $P_{33}$, $P_{34}$, $P_{41}$, $P_{42}$, P43, $P_{44}$ a 2 bits code is associated following steps iv), v.j) or v.k), vi), xii), xiii), xiv).
  u. One of the 8 options (encoded with 3 bits) as per step xv.c will be coded in this way
    i. 2 more bits are added to the bitstream
    ii. 1 virtual bit is coded putting P22+Min_median_error before or after P22+Max_median_error inside the bitstream xvii) For each block send the bitstream as defined in step xvi) to a decoder process.

xviii) Each QxS=4*4 block in encoded to 16+16+16+(15*2)+2=80 bits=16*5=10 bytes instead of 256 bits allows a compression factor of 3.2 if the RGB source format is 565. It is 4.8 if the RGB source format is 888.

In the decoding process, the decoder receives the incoming bitstream and performs the following steps:

v. getP22 w. get P22+Min_median_error after P22+Max_median_error or P22+Min_median_error before P22+Max_median_error: in this way the virtual bits as per step xvi.u.ii) are retrieved)

x. get 2 more bits that with the virtual bits will build the 3 bits as per step 16.u to select how to make the prediction by resorting to one of the patterns addressed by these three bits as shown in FIG. 7a to 7h y. Then compute Min_min_median_error (step xix.w-P22) and Max_median_error (step xix.w-P22)

z. Next compute look-up prediction error palette as per step 9 aa. Use 2 bit code to address look-up table and adding the value stored at this address to P22 as defined in step 4 to recreate each $P_{ij}$ bb. Use colors decoded at step xix.aa as predictors (like defined in step v)

cc. Use 2 bit code to address the look-up table and adding the value stored at this address to predictors defined in xix.bb) to recreate each remaining color The arrangement just described has been implemented the same set of pictures defined previously. The results show that the instant predictive arrangement is able to achieve at least the same performance levels of S3TC and yields a compression factor slightly lower than S3TC on 565 sequences.

The proposed arrangement however achieves unquestionably better quality in the both the 3×3 and 4×4 versions, in spite of a lower compression ratio (i.e. in 4×4 reaches 80% of performance of S3TC). Even when worse quality has been measured, visual assessments showed imperceptible artifacts.

Of course, without prejudice to the underlying principle of the invention, the details and embodiments may vary, also significantly, with respect to what has been described and shown by way of example only, without departing from the scope of the invention as defined by the annexed claims.

The invention claimed is:

1. A method for texture compressing images having a plurality of color components (R, G, B), including decomposing the images in sub-blocks each including only one said color component (R, G, B), the method comprising:

defining at least one first predictor (R22, G22, B22) for each said sub-block;

computing for each said sub-block a respective set of prediction differences between at least some of the pixels of the sub-block and said predictor (R22, G22, B22);

sorting the prediction differences for each sub-block;

generating a look-up prediction differences palette and defining therefrom a look-up prediction error palette; and associating a code with each column of said error palette.

2. The method of claim 1, wherein said code associated with each column of said error palette comprises a two-bit code (00, 01, 10, 11).

3. The method of claim 1, further comprising:

computing for each pixel (Pij) in said images a respective prediction error (Eij) using as a predictor a given pixel (P22) of said images, said given pixel (P22) being the union of the first predictors for said sub-blocks (R, G, B);

for each said prediction error (Eij), computing the Euclidean distance (Distj) between said prediction error and each look-up color in said look-up prediction palette, the difference being between homologous prediction error components;

for each respective prediction error (Eij) finding the minimum of said distance; and composing a bitstream including P22 used as a predictor and Min_error and Max_error used as the minimum and maximum prediction errors per each R,G,B component in the block under coding.

4. The method of claim 1, further comprising defining said first predictor (R22, G22, B22) for each said sub-block (R, G, B) as a prediction for the respective sub-block excluding the predictor (R22, G22, B22) itself.

5. The method of claim 1, further comprising computing, for each said sub-block, a respective set of prediction differences comprised of the differences of said predictor to all the other pixels in the respective sub-block (R, G, B).

6. The method of claim 1, further comprising sorting said prediction differences in ascending order in each said sub-block (R, G, B).

7. The method of claim 1, wherein generating said look-up prediction differences palette comprises:

generating a first value comprising the minimum of the prediction differences of each said sub-block (R, G, B), notated min_errorR, min_errorG, and min_errorB, respectively;

generating a second value comprising the maximum of the prediction differences of each said sub-block (R, G, B), notated max_errorR, max_errorG, and max_errorB, respectively;

generating a third value, notated Int1 comprising (a*min_errorR+b*max_errorR)/(a+b), (c*min_errorG+d*max_errorG)/(c+d), (e*min_errorB+f*max_errorB)/(e+f);

and generating a fourth value, notated Int2, comprising (g*min_errorR+h*max_errorR)/(g+h), (i*min_errorG+l*max_errorG)/(i+l), (m*min_errorB+n*max_errorB)/(m+n), wherein a, b, c, d, e, f, g, h, i, l, m, and n are weighing factors.

8. The method of claim 7, wherein generating said look-up prediction error palette further comprises generating an error palette having the following format:

[Min_errorR, Int1R, Int2R, Max_errorR]

[Min_errorG, Int1G, Int2G, Max_errorG]

[Min_errorB, Int1B, Int2B, Max_errorB].

9. The method of claim 8, further comprising associating a predetermined two-bit code to each column of said look-up prediction error palette.

10. The method of claim 7, further comprising computing Euclidean distance values wherein:

$$Dist1=\sqrt{(|E_{Rij}-\text{Min\_error}R|^2+|E_{Gij}-\text{Min\_error}G|^2+|E_{Bij}-\text{Min\_error}B|^2)}$$

$$Dist2=\sqrt{(|E_{Rij}-\text{Int}1R|^2+|E_{Gij}-\text{Int}1G|^2+|E_{Bij}-\text{Int}1B|^2)}$$

$$Dist3=\sqrt{(|E_{Rij}-\text{Int}2R|^2+|E_{Gij}-\text{Int}2G|^2+|E_{Bij}-\text{Int}2B|^2)}$$

$$Dist4=\sqrt{(|E_{Rij}-\text{Max\_error}R|^2+|E_{Gij}-\text{Max\_error}G|^2+|E_{Bij}-\text{Max\_error}B|^2)}.$$

11. The method of claim 1, further comprising defining said first predictor (R22, G22, B22) for each sub-block as a prediction for a set of colors surrounding said predictor (R22, G22, B22).

12. The method of claim 11, further comprising:
defining two groups of said sorted prediction differences, said groups being composed of the lowest elements and the highest elements in the sorting; and
generating said look-up prediction differences palette wherein,
a first value comprises the median of said first group of prediction differences for each said sub-block, notated min_median_errorR, min_median_errorG, and min_median_errorB, respectively,
a second value comprises the median of said second group of prediction differences for each sub-block, notated max_median_errorR, max_median errorG, max_median_errorB, respectively,
a third value, notated Int1, comprises (a*min_median_errorR+b*max_median_errorR)/(a+b), (c*min_median_errorG+d*max_median_errorG)/(c+d), (e*min_median_errorB+f*max_median_errorB)/(e+f), and a fourth value, notated Int2, comprises (g*min_median_errorR+h*max_median_errorR)/(g+h), (i*min_median_errorG+l*max_median_errorG)/(i+l), (m*min_median_errorB+n*max_median_errorB)/(m+n)

wherein a, b, c, d, e, f, g, h, i, l, m, and n are weighing factors.

13. The method of claim 12, wherein generating said look-up prediction error further comprises generating an error palette having the following format:

[Min_median_errorR,Int1R,Int2R,Max_median_errorR]

[Min_median_errorG,Int1G,Int2G,Max_median_errorG]

[Min_median_errorB,Int1B,Int2B,Max_median_errorB].

14. The method of claim 13, further comprising associating a predetermined code to each column of said error palette.

15. The method of claim 1, further comprising:
defining a second set of predictors (R23, R22, R32, R33; G22, G23, G32, G33; B22, B23, B32, B33) and a plurality of respective scanning patterns in each sub-block (R, G, B) to generate a prediction error among said predictors and the pixel of the block;
computing said respective prediction error (Eij), thus generating a plurality of sets of prediction differences for said sub-blocks, whereby a corresponding plurality of coding options are available corresponding to said sets, said plurality being determined by said sets and the number of said sub-blocks;
coding said image by means of said plurality of coding options;
computing, for each image block and each color component (R, G, B), a difference value with respect to the source colors for all colors inside the block before encoding; and
finding the minimum for said value over said plurality of coding options.

16. The method of claim 15, further comprising computing said difference value as a sum of squared differences.

17. The method of claims 15 further comprising:
composing a bitstream including a P22 pixel;
associating said code to each pixel in said image other than said P22 pixel, whereby one of said plurality of options is coded;
adding a group of additional bits to the bitstream;
coding one virtual bit;
sending said bitstream to a decoder process to generate decoded colors; and
computing said difference value before encoding for each image and for each color component (R, G, B).

18. The method of claim 1, wherein said images comprise RGB color images and said color components comprise the R, G, and B components of said RGB images.

19. The method of claim 3, further comprising:
deriving P22, P22+Min_error, and P22+Max_error from said bitstream, and obtaining therefrom Min_error and Max_error;
computing said look-up prediction error palette using said bit code to address said look-up table; and
adding the value thus retrieved to P22 to recreate each pixel in said images ($P_{ij}$).

20. The method of claim 17, further comprising:
deriving P22 from said bitstream; and
computing said look-up prediction error palette by using said code to address said look-up table and adding the value stored at this address to P22 to recreate each pixel ($P_{ij}$), using the colors thus decoded as predictors, and using said code to address said look-up table and adding the value stored at this address to said predictors to recreate each remaining color.

21. A processor for texture compressing images having a plurality of color components (R, G, B), including decomposing the images in sub-blocks each including only one said color component (R, G, B), comprising:
means for defining at least one first predictor (R22, G22, B22) for each said sub-block;
means for computing for each said sub-block a respective set of prediction differences between at least some of the pixels of the sub-block and said predictor (R22, G22, B22);
means for sorting the prediction differences for each sub-block;
means for generating a look-up prediction differences palette and defining therefrom a look-up prediction error palette; and
means for associating a code with each column of said error palette.

22. The processor of claim 21 wherein said processor comprises a dedicated processor.

23. The processor of claim 21 wherein said processor comprises a programmed general-purpose processor.

24. Computer readable medium encoded with software for performing the following method, the method comprising:

defining at least one first predictor (R22, G22, B22) for each said sub-block;

computing for each said sub-block a respective set of prediction differences between at least some of the pixels of the sub-block and said predictor (R22, G22, B22);

sorting the prediction differences for each sub-block;

generating a look-up prediction differences palette and defining therefrom a look-up prediction error palette; and associating a code with each column of said error palette.

* * * * *